Figure 1:
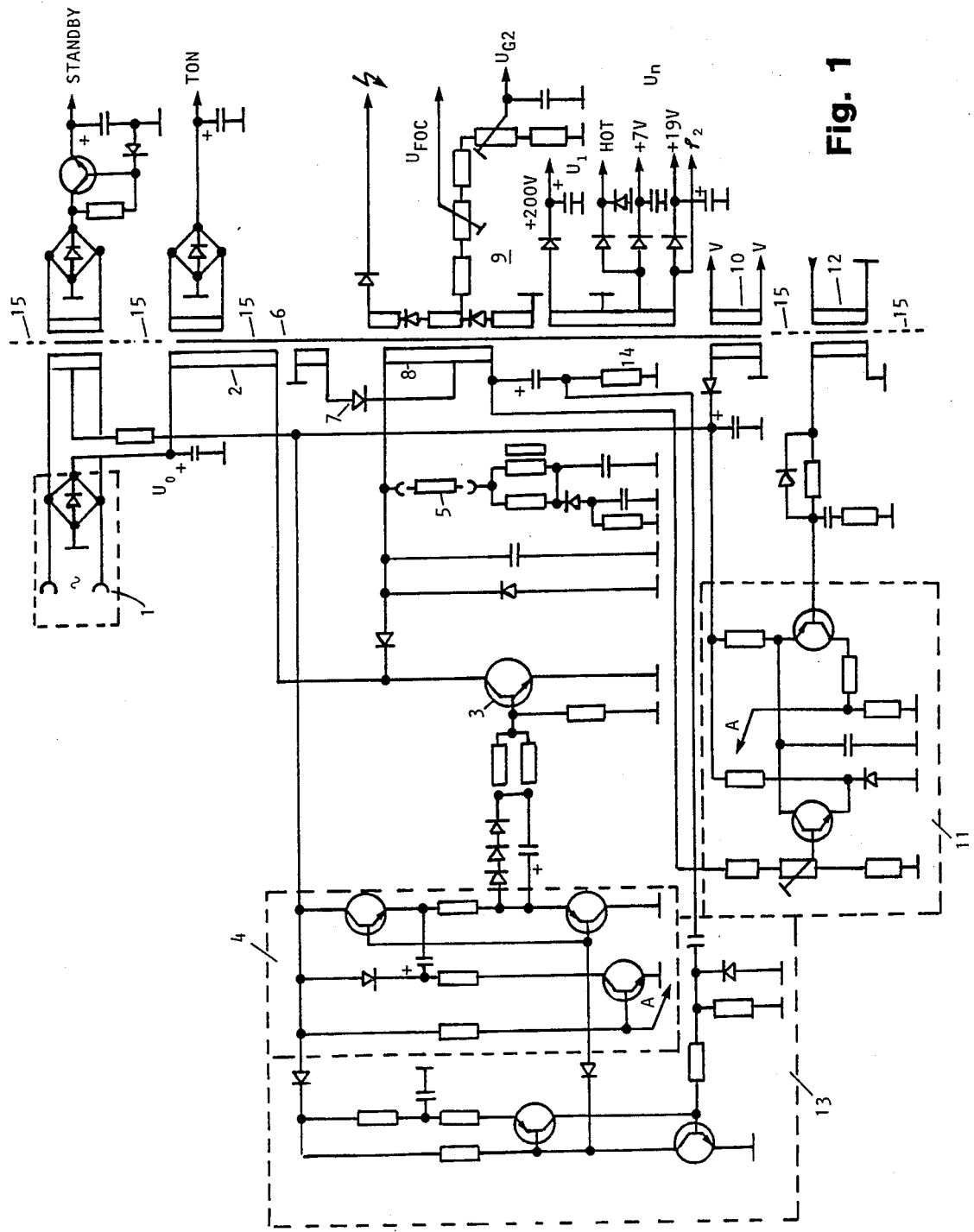

United States Patent [19]

Hartmann et al.

[11] Patent Number: 4,727,464
[45] Date of Patent: Feb. 23, 1988

[54] DEFLECTION MAINS-SUPPLY CONCEPT FOR TELEVISION SETS

[75] Inventors: Uwe Hartmann, Villingen-Schwenningen; Udo Mai, VS-Villingen, both of Fed. Rep. of Germany

[73] Assignee: Deutsche Thomson-Brandt GmbH, Villingen-Schwenningen, Fed. Rep. of Germany

[21] Appl. No.: 945,612

[22] PCT Filed: Mar. 8, 1986

[86] PCT No.: PCT/EP86/00128

§ 371 Date: Nov. 4, 1986

§ 102(e) Date: Nov. 4, 1986

[87] PCT Pub. No.: WO86/05345

PCT Pub. Date: Sep. 12, 1986

[30] Foreign Application Priority Data

Mar. 8, 1985 [DE] Fed. Rep. of Germany ....... 3508267

[51] Int. Cl.[4] ......................................... H02M 3/335
[52] U.S. Cl. ...................................... 363/21; 315/411
[58] Field of Search ............................ 363/20, 21, 97; 315/411; 358/190

[56] References Cited

U.S. PATENT DOCUMENTS

| | | | |
|---|---|---|---|
| 3,920,892 | 11/1975 | Dietz | 358/190 |
| 3,947,632 | 3/1976 | Giger et al. | 358/190 |
| 4,176,304 | 11/1979 | Scott | 315/411 |
| 4,188,568 | 2/1980 | Manners | 358/190 X |
| 4,213,166 | 7/1980 | Watanabe | 358/190 X |
| 4,398,133 | 8/1983 | Beaumont et al. | 358/190 X |
| 4,628,429 | 12/1986 | Walker | 363/21 |

FOREIGN PATENT DOCUMENTS

| | | | |
|---|---|---|---|
| 83533 | 7/1983 | European Pat. Off. | |
| 90085 | 10/1983 | European Pat. Off. | |
| 2606351 | 8/1977 | Fed. Rep. of Germany | 358/190 |
| 3227152 | 2/1984 | Fed. Rep. of Germany | |
| 2294600 | 7/1976 | France | |
| 2313830 | 12/1976 | France | |

*Primary Examiner*—Patrick R. Salce
*Assistant Examiner*—Marc S. Hoff
*Attorney, Agent, or Firm*—Max Fogiel

[57] ABSTRACT

An arrangement in which the horizontal deflection circuit with deflection winding, driver circuit and storage inductance are associated with a side linked with the network, whereas the windings for production of high and operational voltage as well as the horizontal oscillator with phase comparator and the vertical deflection coil, together with their trigger circuits are separated or isolated from the network. The regulating information for the regulation of the circuit network part mounted on the side linked to the network is taken from a regulation circuit separate from the network and transmitted by way of a network-separating combining circuit.

2 Claims, 2 Drawing Figures

DEFLECTION MAINS-SUPPLY CONCEPT FOR TELEVISION SETS

The point of departure for the invention is a deflection mains-supply concept for television sets, wherein the various operating voltages for the television receiver are generated from the line transformer and the losses from horizontal deflection during line flyback and during part of the first half of the forward stroke are rectified by one section of the switching network that obtains energy by periodically closing an electronic switch that is in series with the primary winding of a transformer and the magnetic energy stored in the primary winding while the electronic switch is open is subsequently transmitted to the primary inductance of the line transformer, whereby the primary winding of the television-receiver line transformer is wired parallel to the same electronic switch through a separating diode, with the horizontal-deflection winding connected to the primary winding, whereby the positive deflection current that flows through the deflection winding also flows through the same electronic switch and the negative deflection current flows through a diode that is wired in parallel with the deflection winding and the generated operating voltage is stabilized during fluctuations in the mains voltage because the conductive phase of the electronic switch is pulse-width modulated by a control circuit in such a way that the energy needed for each horizontal deflection is stored in the primary inductance at the end of the conductive phase of the electronic switch or, in other words, at the end of the horizontal forward stroke.

A circuit of this type is specified in German patent No. 2 130 902. It has the advantage that not only mains function but also deflection function are combined in a single circuit, whereby the switch is exploited not only for the switching-network section but also for horizontal deflection. The circuit, however, also has the drawback that the generated operating voltages for the switching-network section are connected to the same ground as the horizontal-deflection circuit due to the start-up of the line switch, which must in principle be connected to the mains. Mains separation is accordingly possible only when an additional switching-network section is employed. This means, however, the expense of an additional power transistor plus a heat sink and additional driving stages. A separate mains transformer can also be involved, which is very heavy and expensive.

The necessity for separating the mains in television equipment has arisen only recently because the equipment is increasingly being employed as monitors for playing back video recordings, for connection to video games and as displays for home computers for example. Mains separation is also an absolute prerequisite for the connection of a headset. Since the connection for peripherals of this description relates strictly to the signal-processing components of the television set, complete mains separation is unnecessary, and it is sufficient when only these components of the equipment are mains separated.

The object of the invention is to ensure mains separation while retaining the cost-effective concept of the circuit constructed in accordance with the preamble to the claim. This object is attained by the invention recited in the claim. The advantage of the invention is that no expensive additional components are needed.

The essentials of the invention will now be specified with reference to the drawings.

FIG. 1 illustrates one way of realizing the invention and

Figure 2:
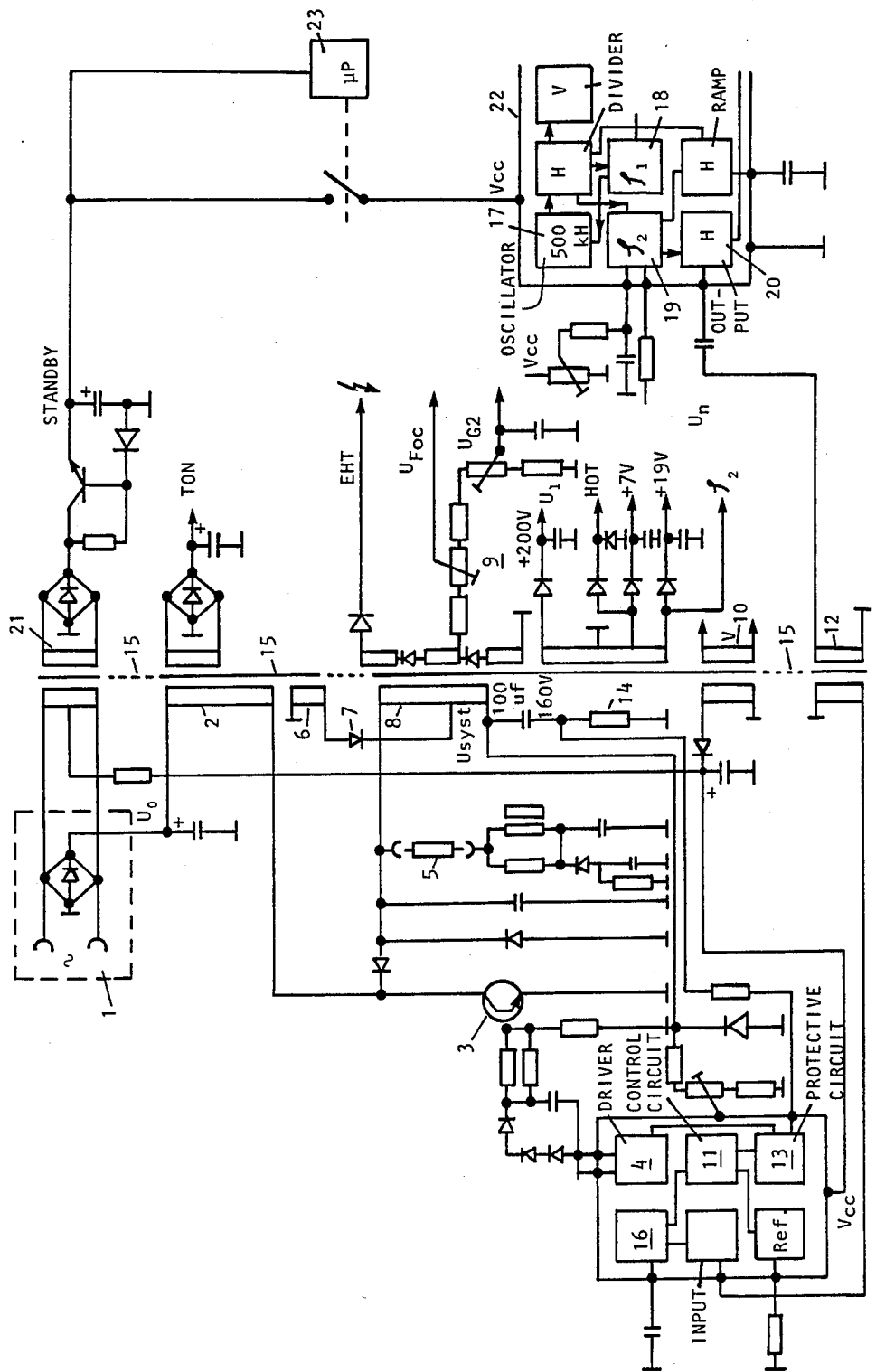

FIG. 2. illustrates a variant of FIG. 1 with integrated switching circuits.

An operating voltage UO rectified from mains alternating-current voltage source 1 is applied through an inductance 2 to a switch 3 that is periodically opened and closed in accordance with line frequency by a driver circuit 4. Switch 3 is also employed to generate operating voltages U1–Un for the television receiver and to generate a deflection current through horizontal-deflection winding 5. This circuit is completely specified in German patent No. 2 130 902. The magnetic energy stored in inductance 2 when switch 3 goes off is transmitted through a winding 6 and a diode 7 to a winding 8 in line transformer 9. The various voltages U1–Un—the voltages that operate the various signal-processing stages, the high voltage, focus voltage, screen-grid voltage, standby voltage, and audio supply voltage—are generated from it on the secondary end of line transformer 9. There is also a winding 10 that can be employed to obtain energy from a switched vertical stage on the mains-separated end of line transformer 9.

The start-up for switch 3 is obtained on the secondary end and transmitted to the primary end though a mains-separating coupling like for example a small pulse transformer 12. An optocoupler can also be employed instead of pulse transformer 12. Since the start-up for switch 3 is mains-separated, the grounds on the mains-connected and mains-separated ends are no longer galvanically connected. Whereas the horizontal-deflection winding is connected to the mains, the vertical-deflection circuit is mains separated. Mains separation is symbolically indicated by line 15.

When the actual control value is obtained from the end associated with the mains, control circuit 11 will also be located on the mains end and will be started up through a mains-separating coupler 12 by a line oscillator on the mains-separated end. If the actual control value is obtained from the mains-separated end and the control circuit is also located there, the information for controlling driver circuit 4 must be obtained through mains-separating coupler 12 in the form of pulse-width modulated signals. The mains-separating coupler 12 illustrated in the figure is a transformer. A protective circuit 13 is also situated on the mains end. It receives information obtained from a sensor 14 when the switching-network section is overloaded, and deactivates driver circuit 4.

A mains separation that complies with the demands is created for the existing known deflection concept with its economical properties.

The circuit illustrated in FIG. 2 is an optimal solution that operates with two integrated switching circuits (21 & 22). The following functions are located on the mains-connected end:

A start-up circuit 16 to activate the circuit with pulses of increasing width, control 11 by means of pulse-width modulation, driver circuit 4 for activating switch 3, and a protective circuit 13. On the mains-separated end are a horizontal oscillator 17 with phase-comparison stages 18 and 19 and an output stage 20 that is connected to transformer 12 to transmit the start-up pulses. This concept has the advantage of precise control because the actual value can be obtained directly from system voltage $U_{syst}$. The protective circuit is simple and reliable because the loading and unloading circuit must be polled at only a single ground point. This ground simultaneously functions as a reference point for the controlled actual value. Pulse transformer 12 can be small because only a wide pulse signal is transmitted without control information. Since the switch-on current demand of integrated switching circuit 22 is low, standby transformer 21 can also be small. The receiver is turned on by applying operating voltage to horizontal oscillator 17 with its output stage 20. The turning-on process can be carried out remotely by means of a microprocessor 23. The start-up circuit 16 in integrated circuit 21 ensures that the pulse widths for starting up driver circuit 4 increase constantly until control circuit 11 assumes control of the pulse widths.

The line of separation in this equipment extends in such a way that the primary mains section, the horizontal-deflection circuit with its horizontal-deflection winding, and the horizontal driver circuit with its voltage supply will be on the mains-connected end whereas all the signal-processing components of the equipment, the high-voltage supply, the supply-voltage rails connected to the line transformer, the vertical-deflection circuit with its vertical-deflection winding, and the line oscillator with its synchronization circuit will be on the mains-separated end. The standby transformer, diode split-line transformer, and a separating transformer or optocoupler for transmitting the control signals from the secondary to the primary end function as mains-separating couplers.

We claim:

1. A deflection line-supply arrangement for television sets in which the line supply is isolated from the television circuits, comprising: a source of alternating-current voltage with means for rectifying a.c. voltage to direct-current voltage; an inductance, and switch means; a driver circuit for periodically opening and closing said switch means in accordance with line frequency of said alternating-current voltage source, said source of alternating-current voltage being applied to said switch means through said inductance; a horizontal-deflection winding, said switch means generating operating voltages for said television circuits and generating a deflection current through said horizontal-deflection winding; a line transformer connected to a diode and a winding, magnetic energy stored in said inductance when said switch means is turned off being transmitted through said winding and said diode to said line transformer; said line transformer having means for generating a plurality of voltages for operating various television circuits; said line transformer having a line-isolated end, and means for obtaining energy from a switched vertical stage on said line-isolated end of said line transformer; a pulse transformer comprising a line-isolating coupling, said line transformer having a primary side and a secondary side, start-up for said switch means being provided on said secondary side and transmitted to said primary side through said pulse transformer; said line supply and said television circuits having grounds isolated from one another, said horizontal-deflection winding being connected to said line supply and said vertical-deflection circuit being isolated from said line supply; a control circuit connected to the line supply end and a line oscillator on the line supply isolated end, said control circuit being started up through said pulse transformer by said line oscillator; a protective circuit connected to the line supply end; sensor means transmitting information to said protective circuit when said switch means is overloaded for deactivating said driver circuit, said line supply end having a start-up circuit providing pulses of increasing width to said control circuit, said driver circuit, said switch means, and said protective circuit; said line isolated end having a horizontal oscillator with phase-comparison stages and an output stage connected to said pulse transformer for transmitting start-up pulses; said pulse transformer transmitting a substantially wide pulse signal without control information, said television circuits being turned on by applying operating voltage to said horizontal oscillator with said output stage; said start-up circuit providing said pulses of increasing width for starting up said driver circuit, said pulse width increasing constantly until said control circuit assumes control of the pulse widths.

2. The deflection line-supply arrangement as defined in claim 1, including microprocessor means for turning on said television circuits remotely.

* * * * *